(12) United States Patent
Bartik et al.

(10) Patent No.: US 10,812,352 B2
(45) Date of Patent: Oct. 20, 2020

(54) SYSTEM AND METHOD FOR ASSOCIATING NETWORK DOMAIN NAMES WITH A CONTENT DISTRIBUTION NETWORK

(71) Applicant: International Business Machines Corporation, Armonk, NY (US)

(72) Inventors: Avishay Bartik, Beer-Sheva (IL); Alon Freund, Ma'ale Adumim (IL); Aviv Ron, Klachim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/278,101

(22) Filed: Feb. 17, 2019

(65) Prior Publication Data

US 2020/0267065 A1    Aug. 20, 2020

(51) Int. Cl.
*G06F 15/173* (2006.01)
*G06F 15/16* (2006.01)
(Continued)

(52) U.S. Cl.
CPC .......... *H04L 43/045* (2013.01); *G06N 20/00* (2019.01); *H04L 41/142* (2013.01);
(Continued)

(58) Field of Classification Search
CPC ... H04L 41/142; H04L 43/067; H04L 61/1511
(Continued)

(56) References Cited

U.S. PATENT DOCUMENTS

| 6,654,807 B2 | 11/2003 | Farber et al. |
| 7,925,782 B2 | 4/2011 | Swaminathan et al. |
| (Continued) |

FOREIGN PATENT DOCUMENTS

| CN | 101741643 | 6/2010 |
| CN | 102111309 | 6/2013 |

OTHER PUBLICATIONS

"Globally Distributed Content Delivery"—Dilley et al, IEEE Internet Computing, vol. 6, Issue 5, Oct. 2002 https://www.akamai.com/uk/en/multimedia/documents/technical-publication/globally-distributed-content-delivery.pdf (Year: 2002).*
(Continued)

*Primary Examiner* — Randy A Scott
(74) *Attorney, Agent, or Firm* — Roy S. Melzer

(57) ABSTRACT

A method for producing a list of network domains comprising: producing a graph comprising a plurality of nodes, each associated with one of a plurality of domain names extracted from data captured from a digital communication network, and a plurality of edges, each associated with one or more syntactic correlations, identified in the data, between two of the plurality of domain names, where the one or more syntactic correlations indicate a possible network structure relationship between the two of the plurality of domain names; producing a list of associated domain names according to a plurality of statistical values each assigned to one of the plurality of edges or one of the plurality of nodes according to an amount of respective one or more syntactic correlations; and providing the list of associated domain names to at least one software object to perform a domain-oriented task.

13 Claims, 7 Drawing Sheets

(51) Int. Cl.
*H04L 29/06* (2006.01)
*H04L 12/26* (2006.01)
*H04L 29/12* (2006.01)
*G06N 20/00* (2019.01)
*H04L 29/08* (2006.01)
*H04L 12/24* (2006.01)

(52) U.S. Cl.
CPC ........ *H04L 43/067* (2013.01); *H04L 61/1511* (2013.01); *H04L 63/1425* (2013.01); *H04L 67/325* (2013.01); *H04L 67/327* (2013.01)

(58) Field of Classification Search
USPC .......................... 709/219, 223, 224, 228, 231
See application file for complete search history.

(56) References Cited

U.S. PATENT DOCUMENTS

| | | | |
|---|---|---|---|
| 9,619,825 B1* | 4/2017 | Albert | G06Q 30/0269 |
| 9,635,049 B1* | 4/2017 | Oprea | H04L 63/145 |
| 10,389,680 B2* | 8/2019 | Manadhata | H04L 67/02 |
| 2015/0227581 A1* | 8/2015 | Yacoub | G06Q 50/01 |
| | | | 707/722 |
| 2017/0041333 A1* | 2/2017 | Mahjoub | H04L 61/1511 |

OTHER PUBLICATIONS

Dilley et al. Globally distributed content delivery, IEEE Internet Computing, vol. 6, Issue: 5, Sep./Oct. 2002; pp. 50-58.

* cited by examiner

SYSTEM AND METHOD FOR ASSOCIATING NETWORK DOMAIN NAMES WITH A CONTENT DISTRIBUTION NETWORK

BACKGROUND

The present invention, in some embodiments thereof, relates to a geographically distributed digital communication network and, more specifically, but not exclusively, to a content distribution network.

A content distribution network (CDN, also known as a content delivery network) is a geographically distributed group of network servers which work together to provide fast delivery of Internet content in order to provide end users with high availability of the Internet content and high performance of one or more Internet services. Some examples of Internet content are: a HyperText Markup Language (HTML) file, a javascript file, an executable software file, a digital image file and a digital video file. Some examples of an Internet service are a video streaming service and a social media platform. A digital content provider may use a CDN service to provide the digital content provider's digital content to a plurality of end users. A CDN service provider may use Internet resources provided by one or more Internet Service Providers (ISP), additionally or alternatively provided by one or more digital communication network carriers, and additionally or alternatively provided by one or more digital communication network operators. Some examples of an Internet resource are a data center, a network server and a network device. Some examples of a network device in a CDN infrastructure are a computer and a router. Some examples of a network device used by an end user are a computer, a smart phone, and a mobile computerized device.

As used henceforth, the term "network" refers to a digital communication network and the terms are used interchangeably. As used henceforth, the term network node refers to one or more Internet resources accessible via the network and perceived by an end user as a single Internet resource.

There is a need to identify network traffic associated with a CDN for a variety of purposes. For example, for the purpose of traffic shaping or applying a quality of service policy to CDN network traffic. Traffic shaping is a network bandwidth management technique to bring network traffic into compliance with a desired traffic profile, and may be used to optimize or guarantee performance, improve latency, or increase usable bandwidth for some kinds of network packets by delaying other kinds of network packets. Another example is for the purpose of traffic policing, i.e. filtering and refraining from forwarding network traffic, for example for reasons of security. Traffic within a CDN may be considered safe, whereas traffic originating from or destined to a network device outside the CDN may be considered suspicious and require further testing prior to forwarding through the CDN.

To identify traffic within a CDN there is a need to identify, in a wide area network comprising a plurality of network nodes, a subset of the plurality of network nodes associated with a common distributed digital communication network, for example a CDN.

SUMMARY

It is an object of the present invention to provide a system and a method for associating domain names with a content distribution network.

The foregoing and other objects are achieved by the features of the independent claims. Further implementation forms are apparent from the dependent claims, the description and the figures.

According to a first aspect of the invention, a method for producing a list of network domains comprises: producing a graph comprising a plurality of nodes, each associated with one of a plurality of domain names extracted from data captured from a digital communication network, and a plurality of edges, each associated with one or more syntactic correlations, identified in the data, between two of the plurality of domain names, where the one or more syntactic correlations indicate a possible network structure relationship between the two of the plurality of domain names; producing a list of associated domain names according to a plurality of statistical values each assigned to one of the plurality of edges or one of the plurality of nodes according to an amount of respective one or more syntactic correlations; and providing the list of associated domain names to at least one software object executed by at least one hardware processor to perform at least one domain-oriented task.

According to a second aspect of the invention, a system for producing a list of network domains comprises at least one hardware processor adapted to: producing a graph comprising a plurality of nodes, each associated with one of a plurality of domain names extracted from data captured from a digital communication network, and a plurality of edges, each associated with one or more syntactic correlations, identified in the data, between two of the plurality of domain names, where the one or more syntactic correlations indicate a possible network structure relationship between the two of the plurality of domain names; producing a list of associated domain names according to a plurality of statistic values each assigned to one of the plurality of edges or one of the plurality of nodes according to an amount of respective one or more syntactic correlations; and providing the list of associated domain names to at least one software object executed by at least one other hardware processor to perform at least one domain-oriented task.

According to a third aspect of the invention, a system for filtering digital communication network messages comprises at least one hardware processor adapted to: receiving, via at least one digital communication network interface connected to the at least one hardware processor, at least one message from a source network device; identifying the source network device in at least one of a list of associated domain names, where the list of associated domain names is produced by at least one other hardware processor adapted to: producing a graph comprising a plurality of nodes, each associated with one of a plurality of domain names extracted from data captured in a digital communication network, and a plurality of edges, each associated with one or more syntactic correlations, identified in the data, between two of the plurality of domain names, where the one or more syntactic correlations indicate a possible network structure relationship between the two of the plurality of domain names; producing the list of associated domain names according to a plurality of statistic values each assigned to one of the plurality of edges or one of the plurality of nodes according to an amount of respective one or more syntactic correlations; and providing the list of associated domain names to at least one software object executed by the at least one hardware processor to perform at least one domain-oriented task; and forwarding the at least one message to at least one destination network device subject to the identification.

With reference to the first and second aspects, in a first possible implementation of the first and second aspects of the present invention the list of associated domain names comprises a plurality of domain clusters, each comprising at least one of the plurality of domain names Optionally, at least one of the plurality of domain clusters is associated with one of a list of identified content distribution networks (CDNs). Optionally, each of the plurality of domain clusters further comprises one or more network addresses extracted from the data. Associating a domain cluster with one of a list of identified CDNs enables performing a CDN specific task using network traffic originating from or targeted to a domain name or a network address of the domain cluster, for example compute one or more CDN specific statistical values or filter network traffic according to association with the CDN.

With reference to the first and second aspects, in a second possible implementation of the first and second aspects of the present invention the data comprises Domain Name Server (DNS) network traffic. Using a plurality of domain names and a plurality of syntactic correlations extracted from DNS traffic increases accuracy of the produced list of associated domain names compared to another list produced using any network traffic, as DNS traffic is tightly coupled with network structure. Optionally, each edge of the plurality of edges has a first node associated with a first domain name and a second node associated with a second domain name Optionally, at least one of the one or more syntactic correlations of an edge of the plurality of edges is identified by: identifying in the data a first DNS request from an identified client to resolve the first domain name associated with the edge's first node, wherein the first DNS request is associated with a first time; and identifying in the data a second DNS request from the identified client to resolve the second domain name associated with the edge's second node, wherein the second DNS request is associated with a second time such that: the first time is earlier than the second time; and a difference between the first time and the second time is no greater than a correlation time threshold. A temporal correlation between two domain names identified in two DNS requests, each a request to resolve one of the two domain names, sent from an identified client within an identified correlation time threshold, may indicate the two domain names are associated, belonging to a common realm of administrative autonomy in a network such as the Internet. Using such a temporal correlation increases accuracy of the list of associated domain names compared to relying on domain names alone, as a CDN may comprise one or more nodes associated with more than one domain name Optionally, at least one of the one or more syntactic correlations of an edge of the plurality of edges is identified by identifying in the data a DNS response to a third DNS request, from another identified client, to resolve the first domain name associated with the edge's first node, wherein the DNS response comprises the second domain name associated with the edge's second node. A protocol correlation between two domain names identified in a DNS request to resolve one of the two domain names may indicate the two domain names are associated, belonging to a common realm of administrative autonomy in a network such as the Internet. Using such a protocol correlation increases accuracy of the list of associated domain names compared to relying on domain names alone, as a CDN may comprise one or more nodes associated with more than one domain name.

With reference to the first and second aspects, in a third possible implementation of the first and second aspects of the present invention each edge of the plurality of edges has a first node associated with a first domain name and a second node associated with a second domain name. The plurality of statistical values comprises: a plurality of appearance values, each assigned to a node of the plurality of nodes and indicative of an amount of appearances of the domain name associated with the node in the data; a plurality of degree values, each assigned to a node of the plurality of nodes and indicative of an amount of edges of the plurality of edges where the node is the edge's first node; a plurality of weight values, each assigned to an edge of the plurality of edges and indicative of an amount of the edge's one or more syntactic correlations; and a plurality of coexistence ratio values, each assigned to an edge of the plurality of edges and indicative of a ratio between a weight value assigned to the edge and an appearance value assigned to the edge's second node. Optionally, the list of associated domain names is produced by applying at least one conformance test to the plurality of statistical values. Optionally, applying the at least one conformance test comprises in each of a plurality of root iterations: selecting a root node having a root domain name; identifying a first edge of the plurality of edges such that the root node is the first edge's first node; applying the at least one conformance test to a group of relevant statistical values comprising the root node's appearance value, the root node's degree value, the first edge's weight value and the first edge's coexistence ratio value; and associating a first domain name of the first edge's second node with the root domain name according to a result of applying the at least one conformance test to the group of relevant statistical values. Optionally, applying the at least one conformance test further comprises in each of the plurality of root iterations: in each of a plurality of domain iterations: selecting a new node having a new domain name associated with the root domain name; selecting a second edge of the plurality of edges such that the new node is the second edge's first node, and the second edge's second node has a second domain name not associated with the root domain name; applying the at least one conformance test to a new group of relevant statistical values comprising the new node's appearance value, the new node's degree value, the second edge's weight value and the second edge's coexistence ratio value; and associating the second domain name of the second edge's second node with the root domain name according to a new result of applying the at least one conformance test to the new group of relevant statistical values. Using the plurality of statistical values of a node and an edge to identify association between two domain names improves accuracy of the list of associated domain names compared to another list produced from the plurality of nodes and plurality of edges disregarding an amount of identifications of an edge in the network data.

With reference to the first and second aspects, in a fourth possible implementation of the first and second aspects of the present invention the list of associated domain names is produced by a machine learning classification model in response to input comprising the plurality of nodes, the plurality of edges, and the plurality of statistical values. Using a machine learning classification model to produce the list of associated domain names increases accuracy of the list of associated domain names compared to another list produced by applying some linear correlation methods to the plurality of syntactic correlation.

With reference to the first and second aspects, in a fifth possible implementation of the first and second aspects of the present invention the data is captured from the digital communication network in an identified period of time. The method further comprises, in each of a plurality of iterations:

producing a new graph comprising a new plurality of nodes, each associated with one of a new plurality of domain names extracted from new data captured from the digital communication network in a new identified period of time, and a new plurality of edges, each associated with one or more new syntactic correlations, identified in the new data, between two of the new plurality of domain names, where the one or more new syntactic correlations indicate a new possible network structure relationship between the two of the new plurality of domain names; producing a new list of associated domain names according to a new plurality of statistic values each assigned to one of the new plurality of edges or one of the new plurality of nodes according to a new amount of respective one or more new syntactic correlations; and providing the new list of associated domain names to the at least one software object to perform the at least one domain-oriented task. Continuously producing a new list of associated domain names improves output of a domain-oriented task using the list of associated domain names compared to using a static list of associated domain names, as network structure changes over time. Optionally, in at least one identified iteration of the plurality of iterations: first new data used in the at least one identified iteration is captured in a first new identified period of time having an identified end time; second new data used in another identified iteration of the plurality of iterations is captured in a second new identified period of time having an identified beginning time; and the identified beginning time is earlier than the identified end time. Using a first new identified period of time and a second new identified period of time that overlap increases accuracy of the list of associated domain names, and thus increases accuracy of an output of a domain-oriented task using the list of associated domain names.

With reference to the first and second aspects, in a sixth possible implementation of the first and second aspects of the present invention the at least one hardware processor is further adapted to output the list of associated domain names via at least one digital communication network interface connected to the at least one hardware processor.

With reference to the third aspect, in a first possible implementation of the third aspect of the present invention, the at least one hardware processor is further adapted to: subject to failure to identify the source network device in any of the list of associated domain names, sending the at least one message to the at least one destination network device according to a result of at least one maliciousness test applied to the at least one message. Forwarding the at least one message according to a result of at least one maliciousness test applied to the at least one message increases security of the destination network device and thus increases accuracy and availability of a service provided by the destination network device. Optionally, the at least one hardware processor is further adapted to: forwarding the at least one message to the at least one destination network device subject to identifying the at least one destination network device in at least one other of the list of associated domain names; and subject to failure to identify the at least one destination network device in the at least one other of the list of associated domain names, sending the at least one message to the at least one destination network device according to another result of at least one other maliciousness test applied to the at least one message.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
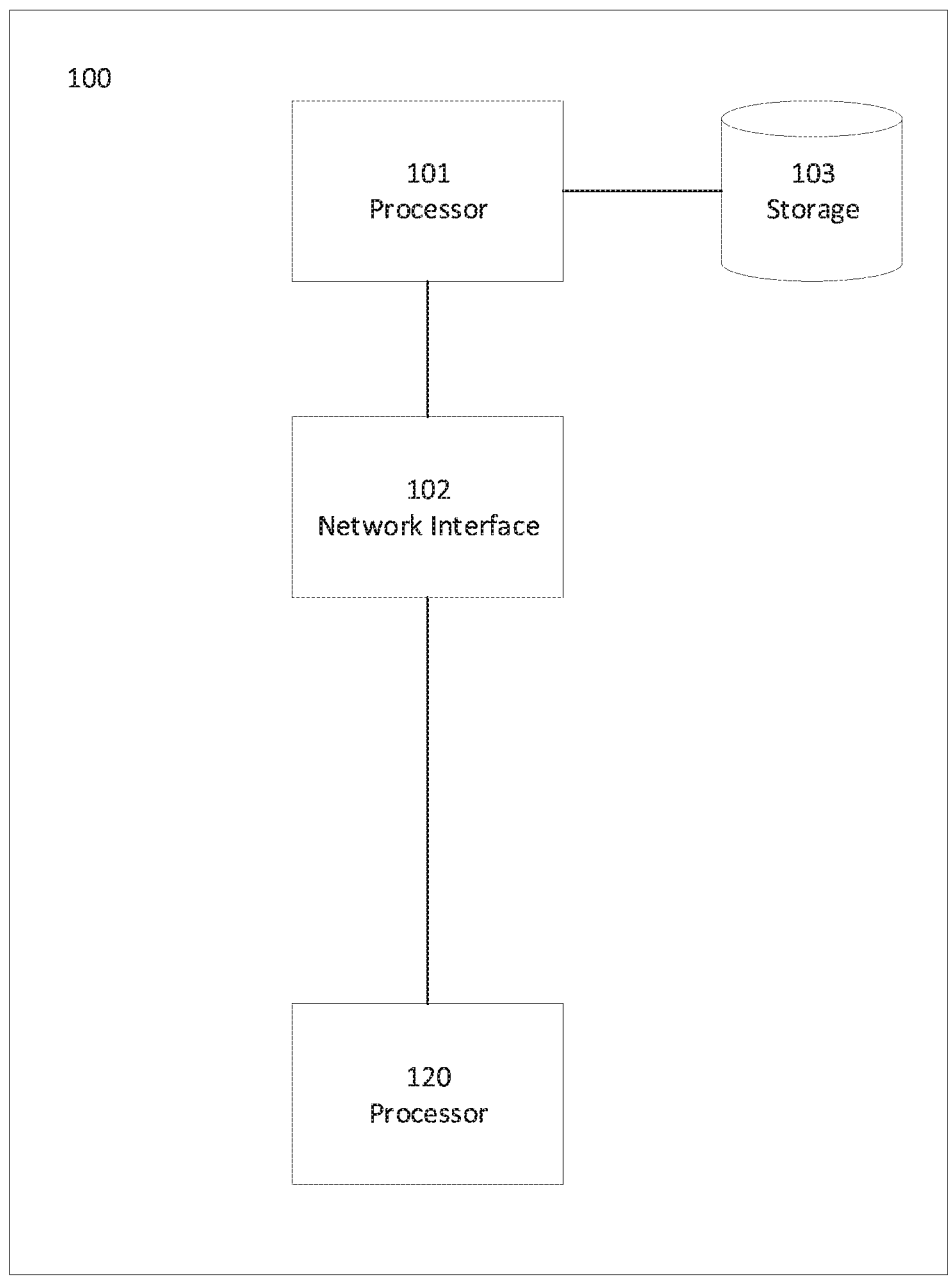
FIG. 1 is a schematic block diagram of an exemplary system, according to some embodiments of the present invention.

The present invention, in some embodiments thereof, relates to a geographically distributed digital communication network and, more specifically, but not exclusively, to a content delivery network (CDN).

A CDN's infrastructure, i.e. a plurality of network nodes used by the CDN to deliver digital content, continually changes. In addition, new CDN service providers appear occasionally on the Internet. A network address, such as an Internet Protocol (IP) address, may be used to uniquely identify a network node. A range of network addresses may be used to identify a group of network nodes. A domain name is an identification string that defines a realm of administrative autonomy, authority or control within the Internet. Domain names are formed by rules and procedures of the Domain Name System (DNS). A domain name may be used to identify one or more network nodes. A CDN may comprise at least one network node associated with a first domain name and additionally or alternatively a first range of network addresses, and at least one other network node associated with a second domain name and additionally or alternatively a second range of network addresses, for example when the first domain name is of a first ISP and the second domain name is of a second ISP, or when the first range of network addresses is associated with a first geographical region and the second range of network addresses is associated with a second geographical region.

A static list of CDN providers and an infrastructure of each CDN cannot accurately represent at all times the correct association between network nodes and CDNs due to the dynamic nature of a CDN's infrastructure, as well as the dynamic nature of the list of CDN providers. There is a need to dynamically identify network addresses and domain names associated with a CDN.

To do so, the present invention proposes, in some embodiments thereof, analyzing captured network traffic to detect CDN related network addresses and domain names. In such embodiments, the present invention proposes extracting a plurality of domain names from data captured from a network and identifying a plurality of syntactic correlations between some of the plurality of domain names, where a syntactic correlation between two of the plurality of domain names indicates a possible network structure relationship between the two domain names A syntactic correlation may be temporal, where each domain name extracted from the data is associated with a time value and where two time values of the two domain names are within an identified time interval. A syntactic correlation may be related to a network protocol, for example where the data comprises a network message comprising the two domain names Optionally, the present invention proposes producing a graph comprising a plurality of nodes, each associated with one of the plurality of domain names, and a plurality of edges, each associated with one or more syntactic correlations of the plurality of syntactic correlations and connecting between two of the plurality of nodes each associated with a domain name associated with respective syntactic correlation. The present invention further proposes optionally producing a list of associated domain names according to a plurality of statistical values each assigned to one of the plurality of edges of one of the plurality of nodes according to an amount of respective one or more syntactic correlations. Using data captured from a network allows identification of possible network structure relationships without requiring maintenance of a list of CDNs and without depending on access to correct and timely updates. Using a syntactic correlation between two domain names, identified in the captured data, as an indication of a possible network structure relationship between the two domain names increases an accuracy of the list of associated domain names compared to relying on domain names alone, as a CDN may comprise one or more nodes associated with more than one domain name. Representing possible network structure relationships using a graph, and weighting the graph using a plurality of statistical values according to an amount of syntactic correlations increase accuracy of the produced list of associated domain names compared to another list produced by applying some linear correlation methods to the plurality of syntactic correlations. Optionally, the list of associated domain names is produced by a machine learning model, in response to input comprising the plurality of nodes, the plurality of edges and the plurality of statistical values. Using a machine learning model to produce the list of associated domain names increases accuracy of the produced list of associated domain names compared to another list produced using some statistical analysis methods. Optionally, the list of associated domain names is produced by applying at least one conformance test to the plurality of statistical values. Applying at least one conformance test to the plurality of statistical values increases accuracy of a produced list of associated domain names compared to another list computed without using the plurality of statistical values.

Optionally, the present invention proposes analyzing DNS traffic. DNS traffic comprises one or more request messages, each comprising a query regarding a domain name, and one or more response messages, each comprising at least one domain name, and optionally a network address and additionally or alternatively another domain name. Extracting the plurality of domain names and the plurality of syntactic correlations from DNS traffic increases accuracy of the produced list of associated domain names compared to another list produced using any network traffic, as DNS traffic is tightly coupled with network structure.

In some embodiments, the present invention further proposes capturing the network data in an identified period of time, and in each of a plurality of iterations using new data captured from the network in a new identified period of time to produce a new graph, comprising a new plurality of nodes and a new plurality of edges, and producing the new list of associated domain names according to the new plurality of nodes, the new plurality of edges and a new plurality of statistical values assigned to the new plurality of nodes and the new plurality of edges. Continuously producing the list of associated domain names increases accuracy of the list of associated domain names over time compared to using a static list that is not updated. Optionally, a beginning time of a first period of time of at least one first iteration of the plurality of iterations is earlier than an end time of a second period of time in a second iteration of the plurality of iterations, such that there is an overlap between the first period of time and the second period of time. Such an overlap is also known as a sliding window. Using a sliding window increases accuracy of the list of associated domain names over time by reducing an amount of time between a change in a CDN's infrastructure and production of a new list of associated domains.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments of the present invention. In such embodiments, at least one hardware processor 101 is connected to at least one digital communication network interface 102. Optionally, at least one digital communication network interface 102 is connected to a local area network (LAN), for example an Ethernet network or a wireless network. Optionally, at least one digital communication network interface 102 is connected to a wide area network (WAN), for example the Internet or a cellular network. Optionally, at least one other hardware processor 120 is connected to at least one hardware processor 101, optionally via at least one digital communication network interface 102. Optionally, at least one hardware processor 101 receives data captured from a digital communication network via at least one digital communication network interface 102, for example from at least one other hardware processor 120. Optionally, at least one hardware processor 101 comprises at least one other hardware processor 120. Optionally, at least one hardware processor 101 reads the data captured from the digital communication network from at least one non-volatile digital storage 103 connected to at least one hardware processor 101. Some examples of a non-volatile digital storage are a hard disk drive, a network connected storage, and a storage network. Optionally, at least one hardware processor 101 uses at least one digital communication network interface 102 to send a produced list of associated domain names, for example to at least one other processor 120.

To produce a list of associated domain names, in some embodiments of the present invention system 100 implements the following non-mandatory method.

Figure 2:
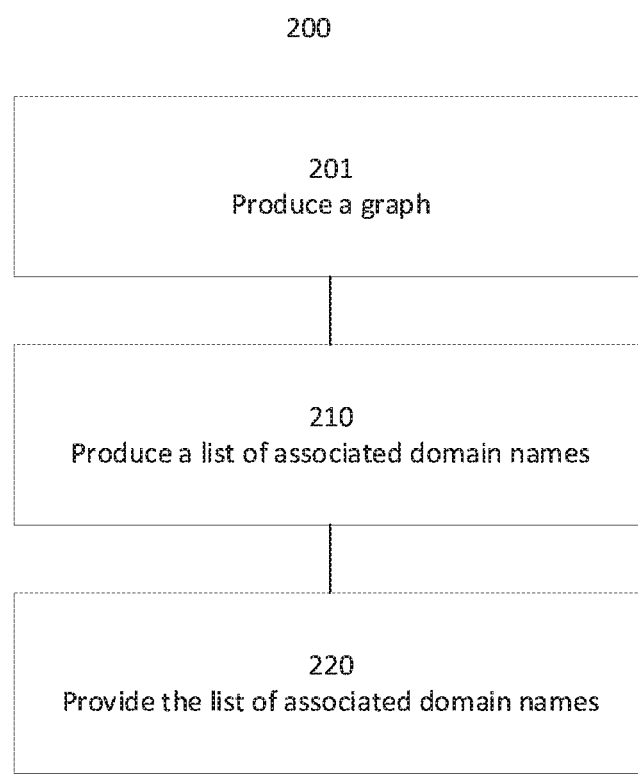
FIG. 2 is a flowchart schematically representing an optional flow of operations for producing a list of associated domain names, according to some embodiments of the present invention.

Reference is now made also to FIG. 2, showing a flowchart schematically representing an optional flow of operations 200 for producing a list of associated domain names, according to some embodiments of the present invention. In such embodiments, in 201 at least one hardware processor 101 produces a graph comprising a plurality of nodes and a plurality of edges. Optionally, each of the plurality of nodes is associated with one of a plurality of domain names extracted from data captured from a digital communication network. Optionally, at least one hardware processor 101 receives the data via at least one digital communication network interface 102, for example from at least one other hardware processor 120. Optionally, at least one hardware processor 101 reads the data from at least one non-volatile digital storage 103. Optionally, each of the plurality of edges is associated with one or more syntactic correlations, identified in the data, between two of the plurality of domain names, where the one or more syntactic correlations indicate a possible network structure relationship between the two of the plurality of domain names. Optionally, the data comprises DNS network traffic. Optionally DNS network traffic comprises one or more DNS request and additionally or alternatively one or more DNS responses.

Optionally, each edge of the plurality of edges has a first node associated with a first domain name of the plurality of domain names, and a second node associated with a second domain name of the plurality of domain names.

Optionally, a syntactic correlation between two of the plurality of domain names is identified when an identified client requests resolving the two domain names within an identified amount of time. To identify such a correlation, at least one hardware processor 101 optionally identifies at least one of the one or more syntactic correlations by identifying in the data a first DNS request from the identified client to resolve the first domain name associated with the edge's first node and identifying in the data a second DNS request from the identified client to resolve the second domain name associated with the edge's second node. Optionally the first DNS request is associated with a first time and the second DNS request is associated with a second time, such that the first time is earlier than the second time and a difference between the first time and the second time is no greater than a correlation time threshold, where the correlation time threshold is indicative of the identified amount of time. An example of a correlation time threshold is an average amount of time for loading a web page, such as 10 seconds. Other examples of a correlation time threshold are an average time to establish a network connection channel, such as 0.5 or 1 second, and an average time to download a predefined amount of bytes of a video stream, such as 20 or 30 seconds.

Optionally, a syntactic correlation between two of the plurality of domain names is identified when a DNS response to a DNS request to resolve one of the two domain names includes the other of the two domain names. To identify such a correlation, at least one hardware processor optionally identifies at least one of the one or more syntactic correlations of an edge of the plurality of edges by identifying in the data a DNS response to a third DNS request, from another identified client, to resolve the first domain name associated with the edge's first node, wherein the DNS response comprises the second domain name associated with the edge's second node. Optionally, the DNS response comprises a CNAME record comprising the second domain name.

In 210, at least one hardware processor 101 optionally produces a list of associated domain names according to a plurality of statistical values, each assigned to one of the plurality of edges or one or the plurality of nodes according to an amount of respective one or more syntactic correlations. Optionally, the plurality of statistical values comprises a plurality of appearance values, each assigned to a node of the plurality of nodes and indicative of an amount of appearances of the domain name associated with the node in the data. For example, the domain name associated with the node may appear in a DNS request. In another example, the domain name associated with the node appears in a DNS response. Optionally, the plurality of statistical values comprises a plurality of degree values, each assigned to a node of the plurality of nodes and indicative of an amount of edges of the plurality or edges where the node is the edge's first node. Optionally, a degree value assigned to a node is indicative of an amount of neighbors of the node in the graph. Optionally, the plurality of statistical values comprises a plurality of weight values, each assigned to an edge of the plurality of edges and indicative of an amount of the edge's one or more syntactic correlations. Optionally, a weight value assigned to an edge is indicative of how frequently the first domain name associated with the edge's first node and the second domain name associated with the edge's second node are syntactically correlated in the data. Optionally, the plurality of statistical values comprises a plurality of coexistence ratio values, each assigned to an edge of the plurality of edges and indicative of a ratio between a weight value assigned to the edge and an appearance value assigned the edge's second node.

Optionally, the list of associated domain names comprises a plurality of domain clusters, each comprising at least one of the plurality of domain names. Optionally, each of the plurality of domain clusters further comprises one or more network addresses extracted from the data. For example, the one or more network addresses may be extracted from one or more DNS responses.

Optionally, the list of domain names is produced by a machine learning classification model, optionally executed by at least one hardware processor 101, in response to input comprising the plurality of nodes, the plurality of edges and the plurality of statistical values. Optionally, the machine learning classification model is a neural network.

Optionally, the list of domain names is produces by at least one hardware processor applying at least one conformance test to the plurality of statistical values.

Figure 3:
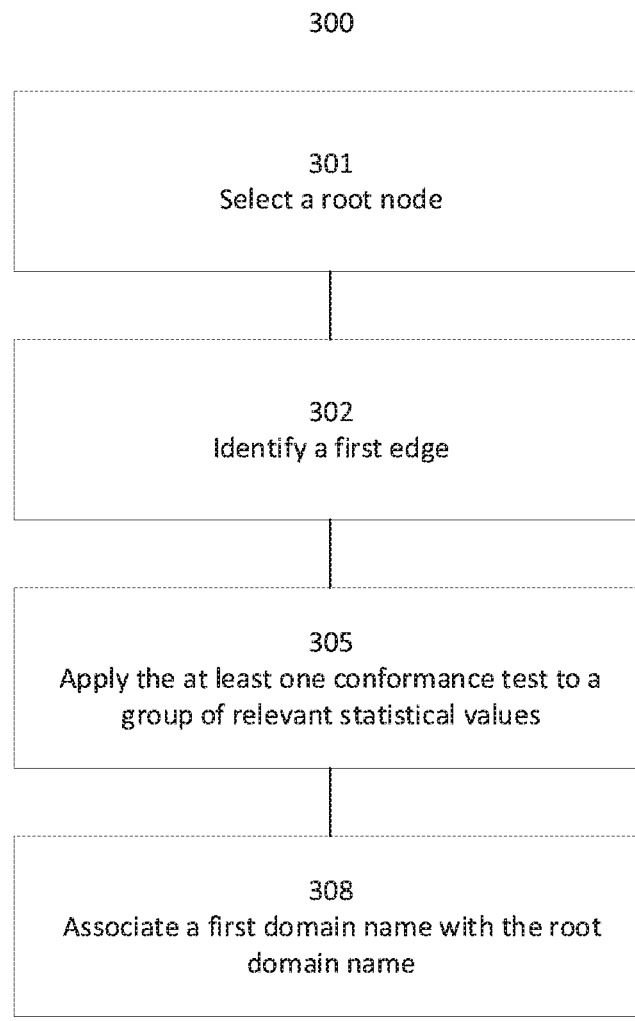
FIG. 3 is a flowchart schematically representing an optional flow of operations for applying a conformance test, according to some embodiments of the present invention.

Reference is now made also to FIG. 3, showing a flowchart schematically representing an optional flow of operations 300 for applying a conformance test, according to some embodiments of the present invention. In such embodiments, at least one hardware processor 101 executes a plurality of root iterations. As used herein, the term "root node" means a node of the plurality of nodes used by at least one hardware processor as a starting node to produce a domain cluster comprising one or more of the plurality of domain names. In each of the plurality of root iterations, in 301 at least one hardware processor optionally selects a root node, of the plurality of nodes, having a root domain name. Optionally, the root node is selected according to a list of known domain names belonging to a CDN. Optionally, the root node is selected at random. Optionally, at least one hardware processor 101 applies a CDN conformance test to the root node to determine whether the root node is associated with a CDN. For example, a possible CDN conformance test applied to a node denoted by u is: node u is associated with a CDN if:

(AppearCount(u)>AppThreshold)
AND
(Degree(u)>DegThreshold)
AND
(HighCoexistenceCount(u)>CoexistenceThreshold)
AND
HighWeightCount(u)>HighWeightThreshold)
Where:
AppearCount(u)—denotes an appearance value assigned to node u;
App Threshold—denotes an identified threshold amount of appearances, for example 20,000;
Degree(u)—denotes a degree value assigned to node u;
Deg Threshold—denotes an identified threshold degree value, for example 3;
HighCoexistenceCount(u)—denotes an amount of edges (u, v) having a high coexistence ratio value greater than an identified threshold ratio value, for example 0.7, where v denotes another node v;
Coexistence Threshold—denotes an identified threshold amount of edges having a high coexistence ratio value, for example 3;
HighWeightCount(u)—denotes an amount of edges (u, v) having a high weight value greater than an identified threshold weight value, for example 10,000; and
HighWeightThreshold—denotes an identified threshold amount of edges having a high weight value, for example 3.

In 302, at least one hardware processor optionally identifies a first edge of the plurality of edges such that the root node is the edge's first node. In 305 at least one hardware processor 101 applies the at least one conformance test to a group of relevant statistical values comprising the root node's appearance values, the root node's degree value, the first edge's weight value and the first edge's coexistence ratio value, and in 308 at least one hardware processor 101 optionally associates a first domain name of the first edge's second node with the root domain name according to a result of applying the at least one conformance test to the group of relevant statistical values. An example of a conformance test applied to the group of relevant statistical values is: associated the first domain name with the root domain name if:

CoexixtenceRatio(rn, on)>RatioThreshold
AND
Weight(rn, on)>WeightThreshold
Where:
rn denotes the root node;
on denotes the first edge's second node;
CoexistenceRatio(rn, on)—denotes a coexistence ratio value assigned to the first edge;

RatioThreshold—denotes an identified threshold ratio value, for example 0.7;

Weight(rn, on)—denotes a weight value assigned to the first edge; and

WeightThreshold—denotes an identified threshold weight value, for example 10000.

Figure 4:
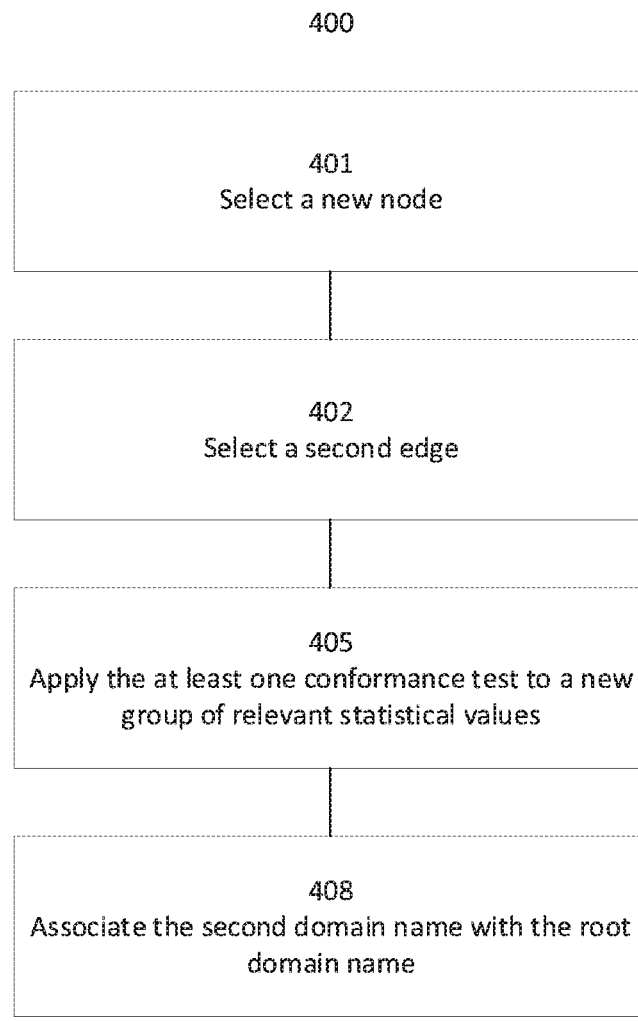
FIG. 4 is a flowchart schematically representing another optional flow of operations for applying a conformance test, according to some embodiments of the present invention.

Optionally, at least one hardware processor 101 further applies the at least one conformance test to other relevant statistical values to further associated one or more other domain names with the root domain name. Reference is now made also to FIG. 4, showing a flowchart schematically representing another optional flow of operations 400 for applying a conformance test, according to some embodiments of the present invention. In such embodiments, in each of the plurality of root iterations at least one hardware processor 101 executes a plurality of domain iterations. In each of the plurality of domain iterations, at least one hardware processor optionally selects in 401 a new node having a new domain name associated with the root domain name. In 402, at least one hardware processor optionally identifies a second edge of the plurality of edges such that the new node is the second edge's first node and the second edge's second node has a second domain name not associated with the root domain name. In 405 at least one hardware processor 101 applies the at least one conformance test to a new group of relevant statistical values comprising the new node's appearance values, the new node's degree value, the second edge's weight value and the second edge's coexistence ratio value, and in 408 at least one hardware processor 101 optionally associates the second domain name of the second edge's second node with the root domain name according to a new result of applying the at least one conformance test to the new group of relevant statistical values.

Reference is now made again to FIG. 2. In 220, at least one hardware processor 101 optionally provides the list of associated domain names to at least one software object executed by at least one other hardware processor 120 to perform at least one domain oriented task. Some examples of a domain oriented task are network traffic shaping, network traffic quality of service, traffic filtering, and a business intelligence task such as providing a view of a CDN market or computing a CDN provider ranking. Optionally, at least one hardware processor 101 outputs the list of associated domain names to at least one other hardware processor 120 via at least one digital communication network interface 102. Optionally, at least one hardware processor 101 associates one or more of the plurality of domain clusters with one of a list of identified CDNs. At least one hardware processor 101 may associate a domain cluster with an identified CDN according to the list of known domain names belonging to a CDN. At least one hardware processor 101 optionally uses metadata retrieved from a registration service, such as a service based on Internet Engineering Task Force (IETF) request for change (RFC) 3912 (also known as WHOIS protocol), to associate a domain cluster with an identified CDN. When a root domain name is associated with a CDN, a cluster of domain names, comprising the root domain name and the one or more other domain names associated with the root domain name, is optionally associated with the CDN.

Optionally, at least one hardware processor periodically produces a new graph. To do so, system 100 optionally further implements the following non-mandatory method.

Figure 5:
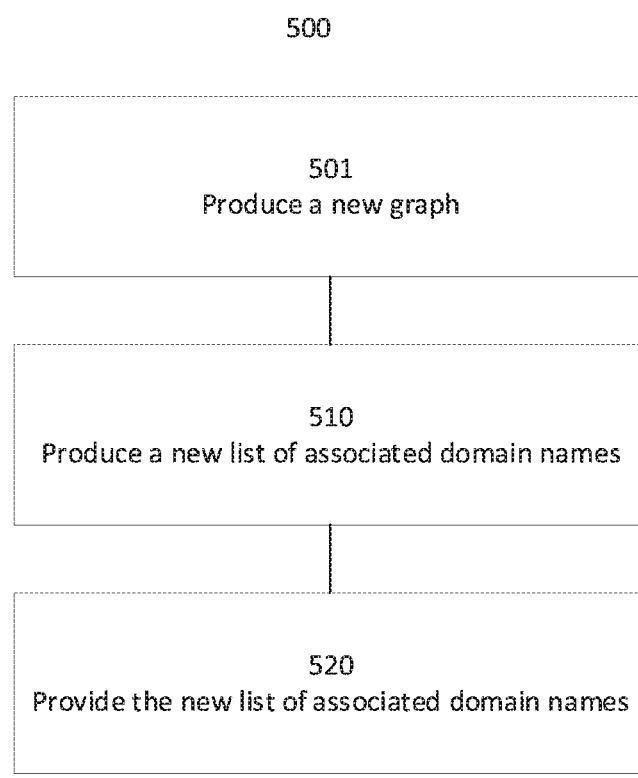
FIG. 5 is a flowchart schematically representing an optional flow of operations for periodically producing a list of associated domain names, according to some embodiments of the present invention.

Reference is now made also to FIG. 5, showing a flowchart schematically representing an optional flow of operations for periodically producing a list of associated domain names, according to some embodiments of the present invention. In such embodiments, the data is captured from the digital communication network in an identified period of time. An example of an identified period of time is 1 day. Another example of an identified period of time is 1 week. Optionally, the data is captured by a network monitor connected to the digital communication network. Optionally, the data is captured from one or more log repositories of one or more DNS servers. Optionally, at least one hardware processor 101 executes a plurality of iterations. In each of the plurality of iterations, at least one hardware processor 101 optionally produces in 501 a new graph comprising a new plurality of nodes and a new plurality of edges. Optionally, each of the new plurality of nodes is associated with one of a new plurality of domain names extracted from new data captured from the digital communication network in a new identified period of time. Optionally, in at least one identified iteration of the plurality of iterations: first new data used in the at least one identified iteration is captured in a first new identified period of time having an identified end time, second new data used in another identified iteration of the plurality of iterations is captured in a second new identified period of time having an identified beginning time, and the identified beginning time is earlier than the identified end time. Optionally, each of the new plurality of edges is associated with one or more new syntactic correlations, identified in the new data, between two of the plurality of new domain names, where the one or more new syntactic correlations indicate a new possible network structure relationship between the two of the new plurality of domain names. In 510, at least one hardware processor 101 optionally produces a new list of associated domain names according to a new plurality of statistical values, each assigned to one of the new plurality of edges or one or the new plurality of nodes according to an amount of respective one or more new syntactic correlations. In 520, at least one hardware processor 101 optionally provides the new list of associated domain names to the at least one software object to perform the at least one domain oriented task.

The term "malicious network traffic", as used herein, refers to a plurality of digital communication network messages for the purpose of detecting and exploiting a vulnerability of a target network node. A malicious message is one of the malicious network traffic's plurality of messages. Applying one or more maliciousness tests to the plurality of digital communication network messages may introduce latency to the network traffic which in turn could reduce availability of a service provided by one or more network nodes. An example of a domain oriented task is filtering digital communication network messages, such that one or more maliciousness tests to detect malicious network traffic are applied only to one or more messages not associated with a CDN, as CDN related traffic may be considered safe. One or more other messages associated with a CDN may be forwarded to one or more destination network devices without introducing latency. CDN related traffic may be traffic originating from a source network device associated with a CDN, optionally from a node of the CDN, optionally from a client of the CDN. CDN related traffic may be traffic destined to a destination network device associated with a CDN.

Figure 6:
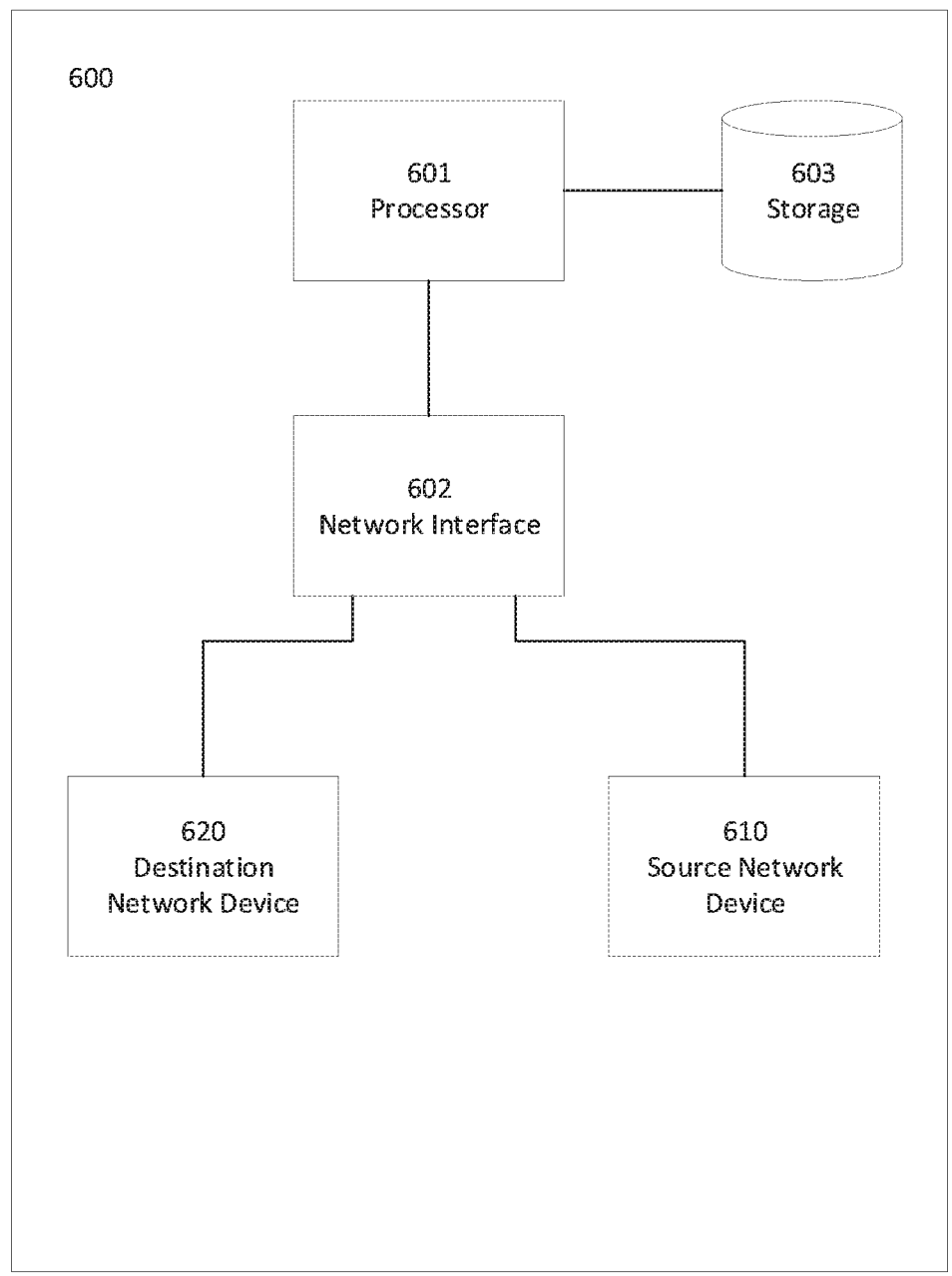
FIG. 6 is a schematic block diagram of an exemplary system for filtering digital communication messages, according to some embodiments of the present invention.

Reference is now made to FIG. 6, showing a schematic block diagram of an exemplary system 600 for filtering digital communication messages, according to some embodiments of the present invention. In such embodiments, at least one hardware processor 601 is connected to at least one source network device 610 via at least one digital communication network interface 602. Optionally, at least one hardware processor 601 is connected to at least one destination network device 620, optionally via at least one digital communication network interface 602. Optionally, at least one hardware processor 601 is connected to at least one non-volatile digital storage 603, optionally for the purpose of retrieving a list of associated domain names, optionally received from at least one other hardware processor, optionally via at least one digital communication network interface 602. Optionally, at least one digital communication network interface 602 is connected to a LAN, for example an Ethernet network or a wireless network. Optionally, at least one digital communication network interface 602 is connected to a WAN, for example the Internet or a cellular network.

To filter digital communication network messages, system 600 implements, in some embodiments of the present invention, the following optional method.

Figure 7:
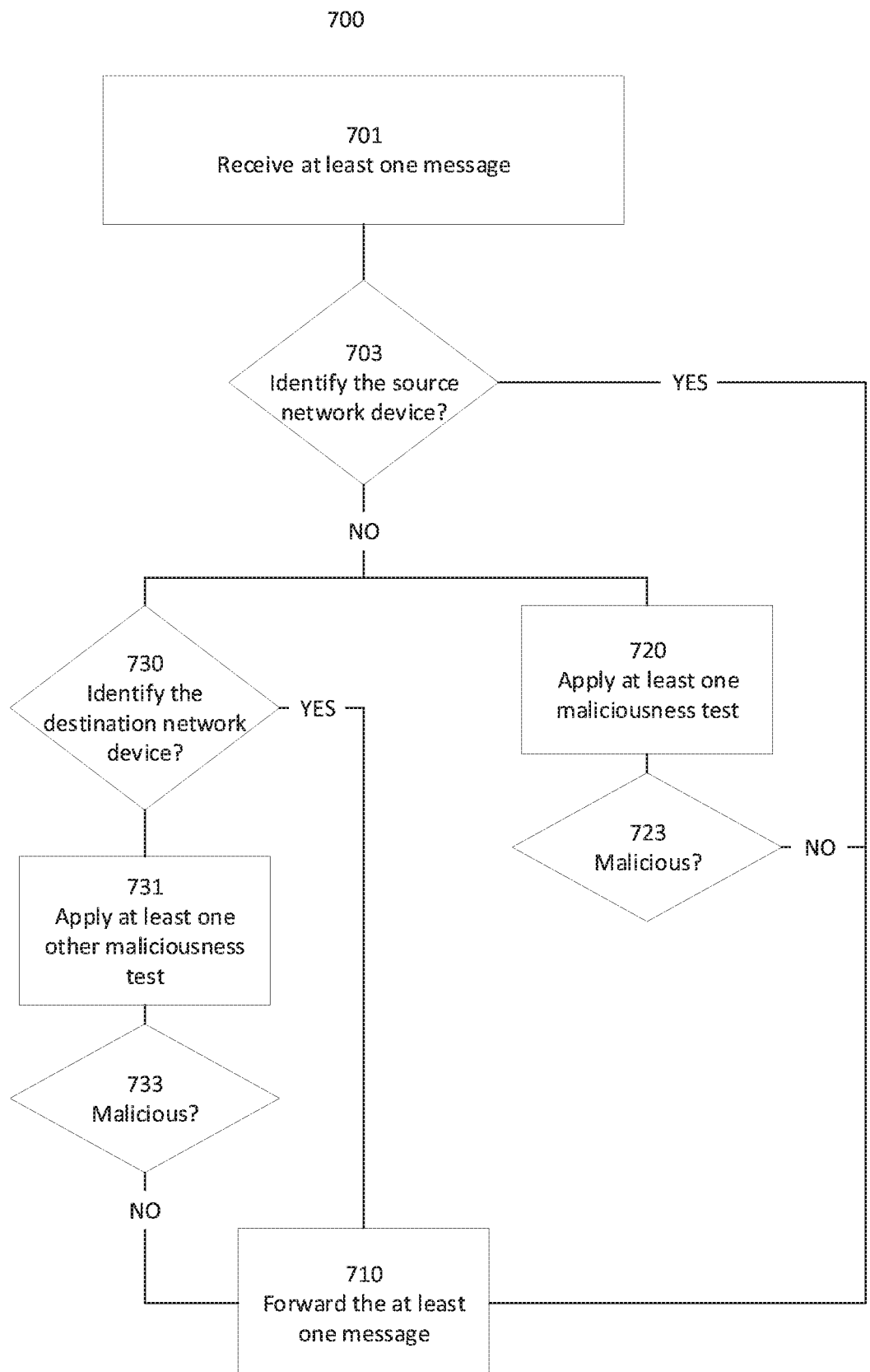
FIG. 7 is a flowchart schematically representing an optional flow of operations for filtering digital communication messages, according to some embodiments of the present invention.

Reference is now made also to FIG. 7, showing a flowchart schematically representing an optional flow of operations 700 for filtering digital communication messages, according to some embodiments of the present invention. In such embodiments, in 701 at least one hardware processor 601 receives at least one message from at least one source network device 610, optionally via at least one digital communication network interface 602. In 703, at least one hardware processor 601 identifies source network device 610 in at least one of a list of associated domain names. Optionally, the list of associated domain names is produced by system 100, optionally using method 200. Optionally, the list of associated domain names is associated with one or more identified CDS. Subject to identifying source network device 610 in at least one of the list of associated domain names, at least one hardware processor 601 optionally forwards in 710 the at least one message to at least one destination network device 620, optionally via at least one digital communication network interface 602. Subject to failure to identify source network device 610 in at least one of the list of associated domain names, at least one hardware processor 601 optionally applies in 720 at least one maliciousness test to the at least one message, and in 723 at least one hardware processor 101 optionally determines a result of applying the at least one maliciousness test to the at least one message. Optionally, applying the at least one maliciousness test to the at least one message comprises classifying the at least one message in one of a plurality of identified maliciousness classifications. Subject to the result of applying the at least one maliciousness test to the at least one message indicating the at least one message is not malicious, at least one hardware processor 601 optionally forwards in 710 the at least one message to at least one destination network device 620.

Optionally, subject to failure to identify source network device 610 in at least one of the list of associated domain names, at least one hardware processor 601 identifies in 730 at least one destination network device 620 in at least one other of the list of associated domain names Optionally, subject to identifying at least one destination network device 620 in at least one other of the list of associated domain names, at least one hardware processor 601 forwards in 710 the at least one message to at least one destination network device 620. Subject to failure to identify destination network device 620 in at least one other of the list of associated domain names, at least one hardware processor 601 optionally applies in 730 at least one other maliciousness test to the at least one message, and in 733 at least one hardware processor 101 optionally determines another result of applying the at least one other maliciousness test to the at least one message. Optionally, applying the at least one other maliciousness test to the at least one message comprises classifying the at least one message in one of the plurality of identified maliciousness classifications. Subject to the other result of applying the at least one other maliciousness test to the at least one message indicating the at least one message is not malicious, at least one hardware processor 601 optionally forwards in 710 the at least one message to at least one destination network device 620.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant syntactic correlations will be developed and the scope of the term syntactic correlation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for producing a list of network domains comprising:
   producing a graph comprising a plurality of nodes, each associated with one of a plurality of domains extracted from data captured from a digital communication network, and a plurality of edges, each associated with one or more syntactic correlations, identified in the data, between two of the plurality of domain names, where the one or more syntactic correlations indicate an available network structure relationship between the two of the plurality of domain names;
   producing a list of associated domain names according to a plurality of statistical values each assigned to one of the plurality of edges or one of the plurality of nodes according to an amount of respective one or more syntactic correlations; and
providing the list of associated domain names to at least one software object executed by at least one hardware processor to perform at least one domain-oriented task;
   wherein the data comprises Domain Name Server (DNS) network traffic;
   wherein each node of the plurality of edges has a first node associated with a first domain name and a second node associated with a second domain name; and
   wherein at least one of the one or more syntactic correlations of an edge of the plurality of edges is identified by:
      identifying in the data a first DNS request from an identified client to resolve the first domain name associated with the edge's first node, wherein the first DNS request is associated with a first time; and
      identifying in the data a second DNS request from an identified client to resolve the second domain name associated with the edge's second node, wherein the second DNS request is associated with a second time such that:
         the first time is earlier than the second time; and
         the difference between the first time and the second time is no greater than a correlation time threshold.

2. The method of claim 1, wherein the list of associated domain names comprises a plurality of domain clusters, each comprising at least one of the plurality of domain names.

3. The method of claim 2, wherein at least one of the plurality of domain clusters is associated with one of a list of identified content distribution networks (CDNs).

4. The method of claim 2, wherein each of the plurality of domain clusters further comprises one or more network addresses extracted from the data.

5. A method for producing a list of network domains comprising:
   producing a graph comprising a plurality of nodes, each associated with one of a plurality of domains extracted from data captured from a digital communication network, and a plurality of edges, each associated with one or more syntactic correlations, identified in the data, between two of the plurality of domain names, where the one or more syntactic correlations indicate an available network structure relationship between the two of the plurality of domain names;
   producing a list of associated domain names according to a plurality of statistical values each assigned to one of the plurality of edges or one of the plurality of nodes according to an amount of respective one or more syntactic correlations; and
providing the list of associated domain names to at least one software object executed by at least one hardware processor to perform at least one domain-oriented task;
   wherein each edge of the plurality of edges has a first node associated with a first domain name and a second node associated with a second domain name; and
   wherein the plurality of statistical values comprises:
      a plurality of appearance values, each assigned to a node of the plurality of nodes and indicative of an amount of appearances of the domain name associated with the node in the data;
      a plurality of degree values, each assigned to a node of the plurality of nodes and indicative of an amount of edges of the plurality of edges where the node is the edge's first node;
      a plurality of weight values, each assigned to an edge of the plurality of edges and indicative of an amount of the edge's one or more syntactic correlations; and
      a plurality of coexistence ratio values, each assigned to an edge of the plurality of edges and indicative of a ratio between a weight value assigned to the edge and an appearance value assigned to the edge's second node.

6. The method of claim 5, wherein the data comprises Domain Name Server (DNS) network traffic.

7. The method of claim 6, wherein each edge of the plurality of edges has a first node associated with a first domain name and a second node associated with a second domain name; and
   wherein at least one of the one or more syntactic correlations of an edge of the plurality of edges is identified by identifying in the data a DNS response to a third DNS request, from another identified client, to resolve the first domain name associated with the edge's first node, wherein the DNS response comprises the second domain name associated with the edge's second node.

8. The method of claim 5, wherein the list of associated domain names is produced by applying at least one conformance test to the plurality of statistical values.

9. The method of claim 8, wherein applying the at least one conformance test comprises in each of a plurality of root iterations:
  selecting a root node having a root domain name;
  identifying a first edge of the plurality of edges such that the root node is the first edge's first node;
  applying the at least one conformance test to a group of relevant statistical values comprising the root node's appearance value, the root node's degree value, the first edge's weight value and the first edge's coexistence ratio value; and
  associating a first domain name of the first edge's second node with the root domain name according to a result of applying the at least one conformance test to the group of relevant statistical values.

10. The method of claim 9, wherein applying the at least one conformance test further comprises in each of the plurality of root iterations:
  in each of a plurality of domain iterations:
    selecting a new node having a new domain name associated with the root domain name;
    selecting a second edge of the plurality of edges such that the new node is the second edge's first node, and the second edge's second node has a second domain name not associated with the root domain name;
    applying the at least one conformance test to a new group of relevant statistical values comprising the new node's appearance value, the new node's degree value, the second edge's weight value and the second edge's coexistence ratio value; and
    associating the second domain name of the second edge's second node with the root domain name according to a new result of applying the at least one conformance test to the new group of relevant statistical values.

11. The method of claim 5, wherein the list of associated domain names is produced by a machine learning classification model in response to input comprising the plurality of nodes, the plurality of edges, and the plurality of statistical values.

12. A method for producing a list of network domains comprising:
  producing a graph comprising a plurality of nodes, each associated with one of a plurality of domains extracted from data captured from a digital communication network, and a plurality of edges, each associated with one or more syntactic correlations, identified in the data, between two of the plurality of domain names, where the one or more syntactic correlations indicate an available network structure relationship between the two of the plurality of domain names;
  producing a list of associated domain names according to a plurality of statistical values each assigned to one of the plurality of edges or one of the plurality of nodes according to an amount of respective one or more syntactic correlations; and
  providing the list of associated domain names to at least one software object executed by at least one hardware processor to perform at least one domain-oriented task;
  wherein the data is captured from the digital communication network in an identified period of time; and
  wherein the method further comprises, in each of a plurality of iterations:
    producing a new graph comprising a new plurality of nodes, each associated with one or a new plurality of domain names extracted from new data captured from the digital communication in a new identified period of time, and a new plurality of edges, each associated with one or more new syntactic correlations, identified in the new data, between the two of the new plurality of domain names;
    producing a new list of associated domain names according to a new plurality of statistic values each assigned to one of the new amount of respective one or more new syntactic correlations; and
    providing the new list of associated domain names to the at least one software object to perform the at least one domain-oriented task.

13. The method of claim 12, wherein in at least one identified iteration of the plurality of iterations:
  first new data used in the at least one identified iteration is captured in a first new identified period of time having an identified end time;
  second new data used in another identified iteration of the plurality of iterations is captured in a second new identified period of time having an identified beginning time; and
  the identified beginning time is earlier than the identified end time.

* * * * *